(12) United States Patent
Eden et al.

(10) Patent No.: US 9,318,986 B2
(45) Date of Patent: Apr. 19, 2016

(54) METHOD OF CONTROLLING AN ELECTRIC MOTOR OF A POWER STEERING SYSTEM, AND POWER STEERING SYSTEM

(71) Applicant: TRW Automotive GmbH, Alfdorf (DE)

(72) Inventors: Mario Eden, Duesseldorf (DE); Keiwan Kashi, Duesseldorf (DE); Timothy Sworn, Birmingham (GB); Chris Mantjios, Rochester, MI (US)

(73) Assignee: TRW Automotive GmbH, Alfdorf (DE)

( * ) Notice: Subject to any disclaimer, the term of this patent is extended or adjusted under 35 U.S.C. 154(b) by 31 days.

(21) Appl. No.: 14/509,214

(22) Filed: Oct. 8, 2014

(65) Prior Publication Data

US 2015/0096826 A1    Apr. 9, 2015

(30) Foreign Application Priority Data

Oct. 9, 2013  (DE) .......................... 10 2013 111 168

(51) Int. Cl.
*B62D 5/04*      (2006.01)
*H02P 6/08*      (2006.01)
*H02P 6/12*      (2006.01)
*H02P 29/02*     (2006.01)

(52) U.S. Cl.
CPC *H02P 6/08* (2013.01); *B62D 5/046* (2013.01); *B62D 5/0484* (2013.01); *B62D 5/0487* (2013.01); *H02P 6/12* (2013.01); *H02P 29/021* (2013.01)

(58) Field of Classification Search
CPC .............. H02P 6/08; H02P 6/12; B62D 5/046; B62D 5/0484; B62D 5/0487
USPC ........................................ 180/446
See application file for complete search history.

(56) References Cited

U.S. PATENT DOCUMENTS

| 4,735,271 | A | * | 4/1988 | Shimizu | B62D 5/0466 180/446 |
|---|---|---|---|---|---|
| 5,257,828 | A | | 11/1993 | Miller et al. | |
| 5,568,389 | A | * | 10/1996 | McLaughlin | B65D 5/0463 180/446 |
| 5,992,556 | A | * | 11/1999 | Miller | B62D 5/0463 180/446 |
| 6,426,602 | B1 | * | 7/2002 | McCann | B62D 5/046 318/284 |
| 6,448,738 | B1 | * | 9/2002 | Burton | B62D 5/046 318/798 |
| 6,647,329 | B2 | * | 11/2003 | Kleinau | B62D 5/046 701/41 |
| 8,994,308 | B2 | * | 3/2015 | Aghili | H02P 25/22 318/453 |

OTHER PUBLICATIONS

German Search Report, Application No. 102013111168.8 dated Jun. 3, 2014.

* cited by examiner

*Primary Examiner* — Tony Winner
(74) *Attorney, Agent, or Firm* — MacMillan, Sobanski & Todd, LLC

(57) ABSTRACT

A method of controlling an electric motor of a power steering system having at least three windings is described, wherein a control unit applies a current to the windings of the electric motor to generate a total torque having a value which is ascertained by the control unit from a set-point torque for steering assistance and a set-point torque for damping. A damping set-point circuit ascertains the set-point torque for damping and a steering assist set-point circuit ascertains the set-point torque for steering assistance. A monitoring circuit monitors the function of the windings of the electric motor. In the event of a malfunction of any of the windings, the monitoring circuit outputs an error signal, upon which the set-point torque for steering assistance is reduced.

13 Claims, 4 Drawing Sheets

METHOD OF CONTROLLING AN ELECTRIC MOTOR OF A POWER STEERING SYSTEM, AND POWER STEERING SYSTEM

CROSS-REFERENCE TO RELATED APPLICATIONS

This application claims priority to German Patent Application No. DE 10 2013 111 168.8 filed Oct. 9, 2013, the disclosures of which are incorporated herein by reference in entirety.

BACKGROUND OF THE INVENTION

The present invention relates to a method of controlling an electric motor of an electric power steering system having at least three windings and to a power steering system having an electric motor for steering assistance.

In an electric power steering system of a motor vehicle, typically an electric motor, in most cases a three-phase electric motor having three windings, is used for providing assistance to the driver during steering maneuvers. To this end, the electric motor is connected to the steering system such that it can transmit a torque to the steering linkage directly or indirectly.

The quantity of this torque, which assists the driver in steering maneuvers, is ascertained by a control unit on the basis of measured variables such as the vehicle speed, the torque in the steering shaft and/or the speed of rotation of the steering shaft. These measured variables are picked up by sensors in the vehicle.

The total torque ascertained by the control unit is normally made up of two components, more specifically the set-point torque for steering assistance and the set-point torque for damping. The set-point torque for steering assistance here constitutes the torque which assists the driver in his/her intended steering maneuver. It is mainly ascertained from the vehicle speed and the current torque in the steering shaft. Accordingly, the set-point torque for steering assistance follows the torque applied by the driver, assisting him/her in the steering process.

The set-point torque for damping improves the driving safety of the vehicle. For this purpose, in addition to the vehicle speed and the torque in the steering shaft, the speed of rotation of the steering shaft is also acquired, and a set-point torque is calculated by the control which avoids heavy steering deflections and counteracts any excessive steering movements of the driver. To this end, the set-point torque for damping may possibly counteract the set-point torque for steering assistance and the torque applied by the driver. The set-point torque for damping thus constitutes a corrective which increases the driving safety.

In the event of a malfunction of the electric motor, the steering assistance is not provided faultlessly, so that an increased steering moment has to be applied, more particularly by the driver. A possible malfunction of the electric motor here includes more particularly defects of the windings, for example a short circuit of one or more windings or a line defect of a winding, resulting in an open phase. To prevent this, the function of the electric motor, particularly that of the windings, is usually monitored, and in the event of a motor defect, a relay is opened so that the windings of the electric motor are disconnected from one another. In this case, the electric motor no longer provides a torque for assisting the driver in steering maneuvers.

In order to counteract an abrupt loss of steering assistance, it is known to continue to operate the electric motor in the case that two windings of the electric motor still function faultlessly. If required, the total torque to be applied by the electric motor is reduced here. However, due to the defect of at least one of the windings, the total torque applied by the electric motor is not constant, but is lower for particular positions of the electric motor or of the steering wheel. In this case, the driver needs to apply a greater steering force until the electric motor position with the weak torque has been overcome. At that moment, a larger torque is suddenly available again, as a result of which a deflection of the steering may occur. This deflection is still further amplified in that a higher set-point torque for steering assistance is requested because of the greater steering force applied by the driver.

BRIEF SUMMARY OF THE INVENTION

A feature of the invention is to provide a power steering system and a method of controlling a power steering system which further improves the driving safety of the vehicle in the event of a fault.

This feature is achieved by a method of controlling an electric motor of a power steering system having at least three windings, wherein a control unit applies a current to the windings of the electric motor to generate a total torque having a value which is ascertained by the control unit from a set-point torque for steering assistance and a set-point torque for damping, a damping set-point circuit ascertains the set-point torque for damping and a steering assist set-point circuit ascertains the set-point torque for steering assistance, a monitoring circuit monitors the function of the windings of the electric motor, in the event of a malfunction of any of the windings, the monitoring circuit outputs an error signal, upon which the set-point torque for steering assistance is reduced.

Based on the invention, only the set-point torque for steering assistance is reduced after an error function of one of the windings has been detected, so that the corrective effect provided by the set-point torque for damping is fully maintained, as a result of which the driving safety of the vehicle is ensured even in the case of a malfunction. At the same time, the reduction in the set-point torque for steering assistance causes the proportion between the set-point torque for steering assistance and the set-point torque for damping to be shifted toward the set-point torque for damping, so that the power steering system is able to react better to any deflections appearing in the set-point torque for steering assistance or deflections of the steering force applied by the driver, and to counteract them.

In the event of a malfunction, the set-point torque for damping is preferably kept constant or increased, in particular in dependence on the vehicle speed. This further intensifies the corrective effect of the set-point torque for damping and further increases the safety of the vehicle.

For example, an error control which receives the error signal of the monitoring circuit reduces the set-point torque for steering assistance, so that it is not required to intervene in the steering assist set-point circuit. In this way, the error susceptibility of the power steering system is reduced.

In one embodiment of the invention, the error control reduces the set-point torque for steering assistance in dependence on the vehicle speed. In particular, the error control continuously adjusts the set-point torque for steering assistance, so that it is ensured that a sufficiently large set-point torque for steering assistance is provided in any driving situation.

Preferably, the error control reduces the set-point torque for steering assistance for the predetermined duration of a transition section of, for example, 10 seconds, and subsequently causes a relay to be opened via which the windings of the electric motor are connected with one another and which preferably is a star point relay. In this way, it is ensured that no abrupt loss of steering assistance will occur, but a certain degree of steering assistance is made available for a transition period.

For example, the error control reduces the set-point torque after receiving the error signal and prior to the beginning of the transition section to the level of the set-point torque during the transition section by means of an input ramp. Thus, the transition between normal operation and operation in the transition section does not proceed abruptly, as a result of which the driving safety is not reduced.

In a further embodiment variant, after the transition section the error control reduces the set-point torque to zero by means of an output ramp and subsequently causes the relay to be opened, the slope of the output ramp being more particularly selected in dependence on the vehicle speed, whereby an abrupt loss of the steering assistance at the end of the transition section is prevented and therefore the driving safety is increased.

Preferably, the steering assist set-point circuit, the damping set-point circuit, the error control and/or the monitoring circuit constitute part of the control unit and/or use the same circuits, which allows the power steering system to be realized in a cost-effective and space-saving manner.

The feature is further achieved by a power steering system having an electric motor for steering assistance, a monitoring circuit for monitoring the electric motor, a control unit for controlling the electric motor, a steering assist set-point circuit for determining a set-point torque for steering assistance, a damping set-point circuit for determining a set-point torque for damping, and an error control for reducing the set-point torque, the electric motor including at least three windings to which a current can be applied by the control unit to generate a total torque, the control unit ascertaining the total torque from the set-point torque for steering assistance and the set-point torque for damping, and the monitoring circuit monitoring the function of the electric motor and, in the event of a malfunction of any of the windings, transmitting an error signal to the error control which thereupon reduces the set-point torque for steering assistance. A power steering system of this type also increases the driving safety since the set-point torque for damping continues to be generated in full by the electric motor and can correctively intervene in the steering process.

In the event of a malfunction of any of the windings, the error signal is preferably also transmitted to the damping set-point circuit which thereupon keeps the set-point torque for damping constant or increases it, in particular in dependence on the vehicle speed, as a result of which the ratio between the set-point torque for damping and the set-point torque for steering assistance is shifted further toward the set-point torque for damping. This increases the capability of the power steering system to counteract any deflections in the set-point torque for steering assistance and in the steering force applied by the driver.

By way of example, the error control reduces the set-point torque for steering assistance for the predetermined duration of a transition section of, for example, 10 seconds, and subsequently causes a relay to be opened via which the windings of the electric motor are connected with one another and which more particularly is a star point relay. In this way, any abrupt loss of the steering assistance is prevented, as a result of which the driving safety is further increased.

In a further embodiment of the invention, the error control maintains or increases the set-point torque for damping in the event of a malfunction of any of the windings, in particular in dependence on the vehicle speed. In this way, both set-point torques are adjusted by the error circuit, whereby the ratio between the set-point torque for steering assistance and the set-point torque for damping can be optimized in a simple manner.

In one embodiment variant, the steering assist set-point circuit, the damping set-point circuit, the error control and/or the monitoring circuit constitute part of the control unit and/or use the same circuits, which allows a compact and cost-efficient power steering system to be realized.

Furthermore, both in the method of controlling the power steering system and also in the power steering system, the relay can be opened immediately when the monitoring circuit detects that less than two windings are operating faultlessly.

Other advantages of this invention will become apparent to those skilled in the art from the following detailed description of the preferred embodiments, when read in light of the accompanying drawings.

DETAILED DESCRIPTION OF THE INVENTION

Figure 1:
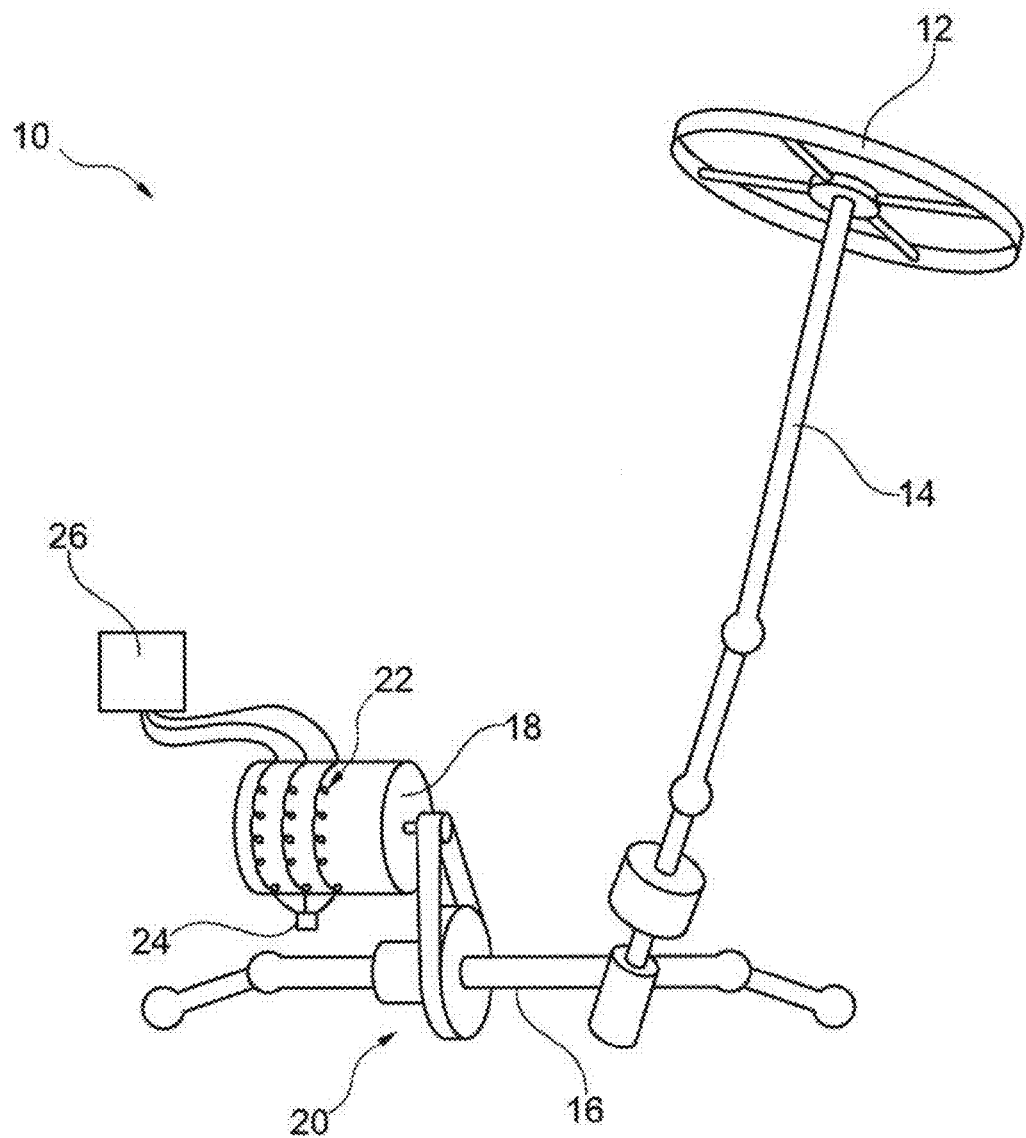
FIG. 1 shows a schematically shows a power steering system according to the invention.

FIG. 1 schematically shows a power steering system 10 having a steering actuating element 12 which is connected to a steering shaft 14 for joint rotation therewith. The steering shaft 14 for its part is connected with a steering gear 16 which is connected with the wheels of the vehicle (not shown) by means of a steering linkage. An electric motor 18 is connected with the steering gear 16 by means of a belt drive 20 and can apply a torque to a steering rod arranged in the steering gear. The electric motor 18 is, for example, a three-phase electric motor having three windings 22 which are electrically connected with one another by means of a relay 24, for example a star point relay. The electric motor 18 is controlled by a control unit 26.

It is, of course, also possible that the electric motor 18 is connected with the steering shaft 14 and applies a torque thereto or, in the case of a steering gear having a steering drop arm, applies a torque to the latter.

Figure 2:
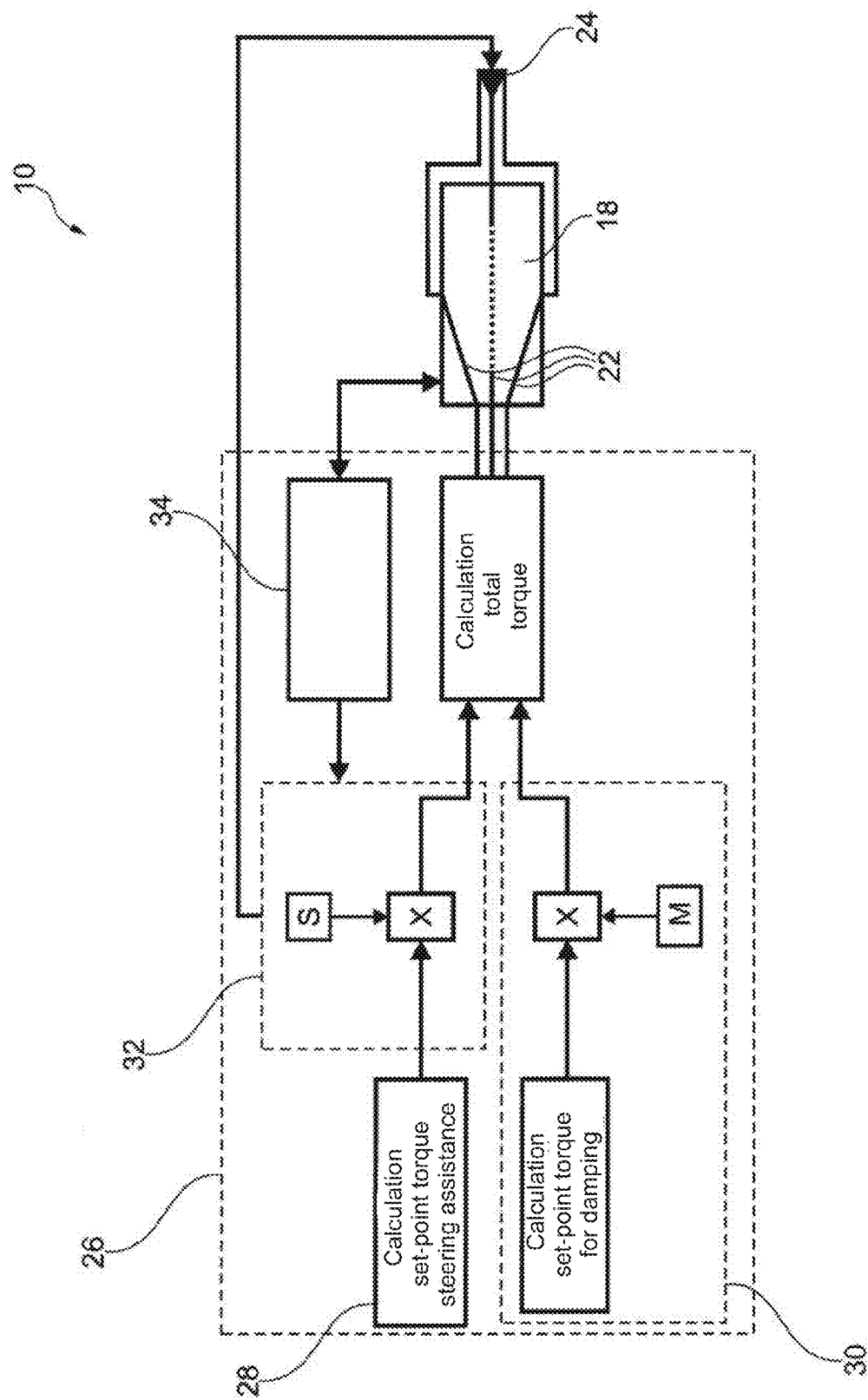
FIG. 2 shows a schematic illustration of a circuit diagram of a power steering system according to the invention.

The control unit 26 is schematically illustrated in FIG. 2, with FIG. 2 also showing the method of controlling the power steering system. The control unit 26 includes a steering assist set-point circuit 28, a damping set-point circuit 30, and an error control 32.

The steering assist set-point circuit 28 is connected to the error control 32. The error control 32 outputs a signal to further portions of the control unit 26 which in turn receive a signal of the damping set-point circuit 30.

The information about the set-point torque for steering assistance and about the set-point torque for damping, which is transferred to the control unit 26 by the error control 32 and the damping set-point circuit 30, respectively, can be used by the control unit 26 to ascertain a total torque which is to be applied for steering assistance.

In addition, the control unit 26 is configured to apply a current to the windings 22 of the electric motor 18, for the latter to generate the total torque ascertained.

Furthermore, the error control 32 is connected to the relay 24 via a signal line and, moreover, can receive a signal containing information about the current vehicle speed.

The control unit 26 also includes a monitoring circuit 34 which is connected to the electric motor 18 and can transmit a signal to the error control 32 and, if required, to the relay 24.

The method of controlling the power steering system will now be explained below.

In normal, fault-free operation, both the steering assist set-point circuit 28 and the damping set-point circuit 30 receive signals from sensors (not shown) which contain information about the current vehicle speed and the torque transferred in the steering shaft 14. The damping set-point circuit 30 may furthermore receive information about the speed of rotation of the steering shaft 14. Of course, also other or further measured data may be transmitted to the steering assist set-point circuit 28 and the damping set-point circuit 30 for evaluation by them.

Based on this information, the steering assist set-point circuit 28 and the damping set-point circuit 30 ascertain the currently desired set-point torque for steering assistance and the necessary set-point torque for damping.

The set-point torque for steering assistance ascertained is then transmitted to the error control 32, which, however, in the absence of any error indications, transfers this signal to the control unit 26 without any changes. The control unit 26 will now ascertain the desired total torque, based on the set-point torque for steering assistance and the set-point torque for damping which it has received from the damping set-point circuit 30. Thereupon the power supply of the individual windings 22 of the electric motor 18 is adjusted such that the latter generates the desired total torque.

The monitoring circuit 34 is configured to monitor the electric motor 18 in terms of its function. In case it detects a malfunction, it transmits an error signal to the error control 32 and, if required, to the damping set-point circuit 30. In this context, a malfunction of the electric motor 18 should be understood to mean any fault which causes at least one of the windings 22 of the electric motor 18 to be no longer able to be used for driving the electric motor 18, for example due to a short circuit or a line disconnection.

Now, when the monitoring circuit 34 detects a fault or error in the electric motor 18, such as, e.g., an open phase caused by a line disconnection, and if two of the windings 22 are still intact, the monitoring circuit 34 sends an error signal to the error control 32 and, if required, to the damping set-point circuit 30.

The error control 32 thereupon reduces the set-point torque for steering assistance. This is done, for example, by multiplication of the set-point torque for steering assistance by a scaling factor of $S<1$.

Figure 3:
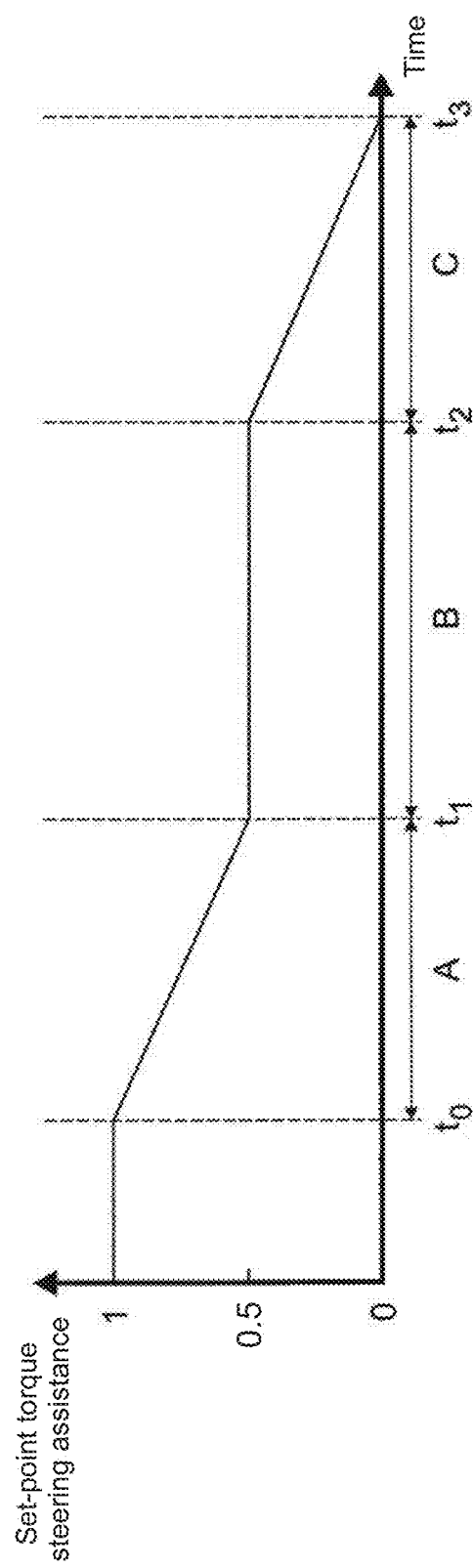
FIG. 3 shows an illustration of the reduction of the set-point torque for steering assistance over time.

As an example, FIG. 3 illustrates the development over time of the value of the set-point torque for steering assistance for an exemplary driving situation, in which one of the windings 22 of the electric motor 18 fails at time $t_0$. The current quantity of the set-point torque for steering assistance relative to the quantity of the set-point torque for steering assistance in a driving situation without a malfunction of the electric motor 18 is plotted on the ordinate in the illustration.

The reduction in the set-point torque for steering assistance by the error control 32 comprises three different sections A, B, and C.

Section A begins at time $t_0$, at which the error control 32 has received the error signal of the monitoring circuit 34, and ends at time $t_1$. In this section A, the set-point torque for steering assistance is continuously ramped down by the error control 32 by means of an input ramp from its normal value, denoted as 100% here, to the reduced level of the set-point torque for steering assistance, for example 50% of the level in the case without a malfunction.

Section B begins at time $t_1$ and has a duration of, for example, 10 seconds, until time $t_2$. In this section B, or transition section B, the level of the set-point torque for steering assistance is held, so that the electric motor 18 continues to assist the driver in steering maneuvers, but to a lesser extent. During the transition section, the level of the set-point torque for steering assistance can be continuously adjusted to the vehicle speed, so that changes in driving situations can also be taken into account.

The set-point torque for steering assistance and therefore also the total torque is greatly reduced in section B such that the driver will clearly recognize a malfunction of the power steering and should thereby be motivated to park the vehicle and have it towed to a garage.

Section C begins at time $t_2$. In section C, the error control 32 continuously further reduces the set-point torque for steering assistance by means of an output ramp, until the set-point torque for steering assistance is zero at a time $t_3$. The slope of the output ramp may be selected in dependence on the vehicle speed.

Once the set-point torque has been reduced to zero, the error control 32 sends a signal to the relay 24, whereupon the relay 24 will open and disconnect the windings 22 of the electric motor 18 from one another. As of this time $t_3$, there is no longer any steering assistance.

To increase the ratio of the set-point torque for damping in relation to the set-point torque for steering assistance, the set-point torque for damping can be increased after the monitoring circuit 34 has detected a malfunction. This may be done, for example, with the aid of a multiplier M which is used for multiplying the set-point torque for damping ascertained.

In the event that the monitoring circuit 34 detects less than two operative windings 22 of the electric motor 18, the monitoring circuit 34 sends a signal to the relay 24, either directly or via the error control 32, so that the relay 24 opens and the steering assistance is terminated in this way. This abrupt termination of the steering assistance is necessary since, in the case of less than two operative windings, a steering assistance provided by the electric motor 18 to the driver is no longer possible. In addition, there is the possibility that due to magnetic induction in the windings 22, the electric motor 18 forms a resistance against rotation of the steering shaft, thus making the steering even more difficult for the driver.

Figure 4:
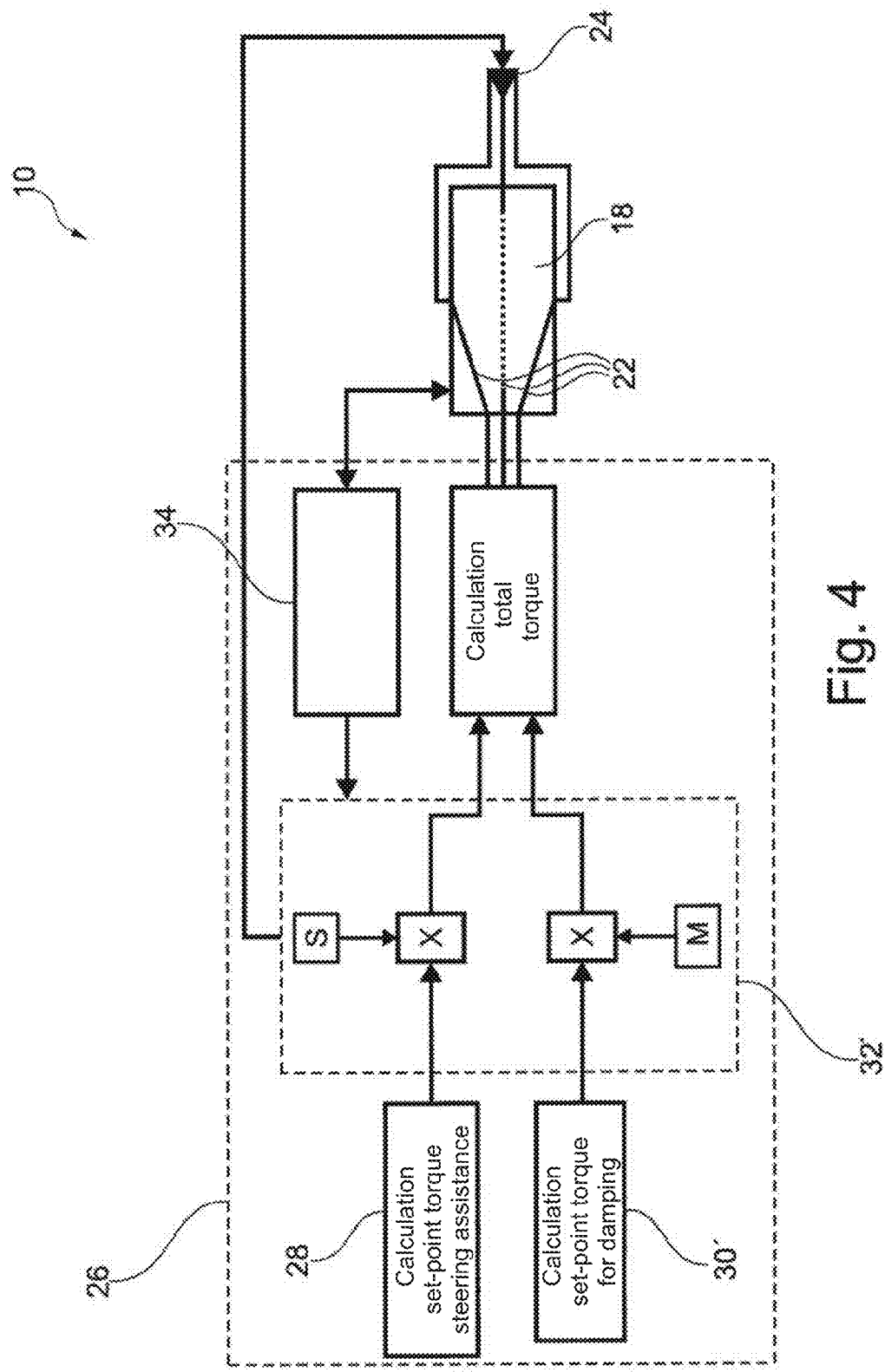
FIG. 4 shows a circuit diagram of a second embodiment according to the invention of a power steering system.

Of course, the steering assist set-point circuit 28, the damping set-point circuit 30, the error control 32 and/or the monitoring circuit 34 may constitute part of the control unit 26 and/or share the same circuits. FIG. 4 illustrates an alternative embodiment of the power steering system which is largely similar to that of the first exemplary embodiment in terms of its structure and function. For this reason, only the differences will be discussed.

In this second embodiment, the signal of the damping set-point circuit 30' is also transferred to the error control 32'. In the event of an error, the set-point torque for damping can therefore be increased or kept the same by the error control 32' as well, for example by multiplication by a multiplier $M>1$ before the total torque is ascertained by the further portions of the control unit 26.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A method of controlling an electric motor of a power steering system having at least three windings comprising:
    applying a current to the windings of the electric motor by a control unit to generate a total torque having a value which is ascertained by the control unit from a set-point torque for steering assistance and a set-point torque for damping;
    ascertaining the set-point torque for damping by a damping set-point circuit;
    ascertaining the set-point torque for steering assistance by a steering assist set-point circuit;
    monitoring a proper function of the windings of the electric motor by a monitoring circuit; and
    in the event of a malfunction of any of the windings, outputting an error signal by the monitoring circuit, upon which the set-point torque for steering assistance is reduced.

2. The method according to claim 1, wherein in an event of a malfunction, the set-point torque for damping is kept constant or is increased in dependence on a vehicle speed.

3. The method according to claim 1, wherein an error control which receives the error signal of the monitoring circuit reduces the set-point torque for steering assistance.

4. The method according to claim 3, wherein the error control reduces, more particularly continuously adjusts, the set-point torque for steering assistance in dependence on a vehicle speed.

5. The method according to claim 3, wherein the error control reduces the set-point torque for steering assistance for a predetermined duration of a transition section of time, and subsequently causes a relay to be opened via which the windings of the electric motor are connected with one another by a star point relay.

6. The method according to claim 5, wherein the error control reduces the set-point torque after receiving the error signal and prior to a beginning of the transition section to a level of the set-point torque during the transition section by means of an input ramp.

7. The method according to claim 5, wherein after the transition section, the error control reduces the set-point torque to zero by means of an output ramp and subsequently causes the relay to be opened, a slope of the output ramp being selected in dependence on a vehicle speed.

8. The method according to claim 1, wherein the steering assist set-point circuit, the damping set-point circuit, the error control and/or the monitoring circuit constitute part of the control unit and/or use the same circuits.

9. A power steering system comprising:
    an electric motor for steering assistance;
    a monitoring circuit for monitoring the electric motor;
    a control unit for controlling the electric motor;
    a steering assist set-point circuit for determining a set-point torque for steering assistance;
    a damping set-point circuit for determining a set-point torque for damping; and
    an error control for reducing the set-point torque for steering assistance;
    wherein the electric motor includes at least three windings to which a current can be applied by the control unit to generate a total torque, the control unit ascertaining the total torque from the set-point torque for steering assistance and the set-point torque for damping, and the monitoring circuit monitoring proper function of the electric motor and, in the event of a malfunction of any of the windings, transmitting an error signal to the error control which thereupon reduces the set-point torque for steering assistance.

10. The power steering system according to claim 9, wherein in the event of a malfunction of any of the windings, the error signal is also transmitted to the damping set-point circuit which thereupon keeps the set-point torque for damping constant or increases it, in dependence on a vehicle speed.

11. The power steering system according to claim 9, wherein in the event of a malfunction of any of the windings, the error control keeps the set-point torque for damping constant or increases it, in dependence on a vehicle speed.

12. The power steering system according to claim 9, wherein the error control reduces the set-point torque for steering assistance for a predetermined duration of a transition section of time, and subsequently causes a relay to be opened via which the windings of the electric motor are connected with one another by a star point relay.

13. The power steering system according to claim 9, wherein the steering assist set-point circuit, the damping set-point circuit, the error control and/or the monitoring circuit constitute part of the control unit and/or use the same circuits.

* * * * *